March 19, 1946.  W. J. SIX  2,397,056

PISTON EXPANDER

Filed Jan. 4, 1945

INVENTOR.
WALTER J. SIX.
BY
Lockwood, Goldsmith & Galt.
ATTORNEYS.

Patented Mar. 19, 1946

2,397,056

UNITED STATES PATENT OFFICE 2,397,056

PISTON EXPANDER

Walter J. Six, Indianapolis, Ind.

Application January 4, 1945, Serial No. 571,278

11 Claims. (Cl. 309—12)

This invention relates to an expander for a piston skirt adapted for use in the cylinders of internal combustion engines, compression engines, steam engines and the like, whereby the skirt may be expanded to take up wear and prevent slap in the cylinder.

By means of the character and structure of this expander, it may be employed either as a one piece or two piece expander, depending upon the requirements of the particular piston and the extent of the desired expansion.

The principal feature of this invention is to provide an expander which may be locked and adjusted within the piston skirt, such as not only to permit convenient installation, but will positively prevent displacement or escape. But more particularly, and in addition thereto, its inherent expanding characteristics under spring tension may be augmented by a camming action such as to variably increase its tension and, therefore, its expanding force. This variable camming action has the added advantage of permitting the use of one size of expander in skirts of varying diameter within limits. Thus, all sizes of pistons may be accommodated by a comparatively few sizes of expanders. This is of considerable advantage in that the number of sizes of expanders required to be carried in stock is substantially reduced.

This is accomplished by providing the spring expander with a pair of retaining arms formed to engage and interlock with the boss portions of the piston to removably secure the expander in position, said arms having slidable camming connection with the expander, such as to increase its tension to exert any desired yielding pressure upon the piston skirt.

The full nature of the invention will be understood from the accompanying drawing and the following description and claims:

Figure 1:
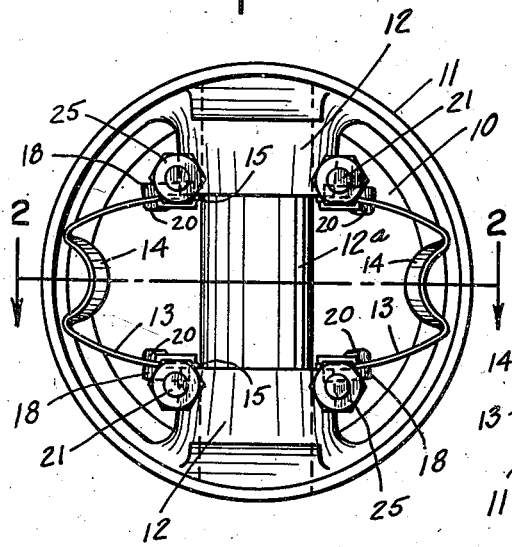
Fig. 1 is a bottom plan view of a piston showing a pair of expanders according to this invention mounted therein.

In the drawing there is shown a piston having a head 10, a depending cylindrical skirt 11, and inwardly extending wrist pin bosses 12 for receiving a wrist pin 12a, said bosses and pin forming an interior transverse structure carried by the skirt. As shown herein, there is mounted within the skirt in opposed relation a pair of spring expanders 13 compressed under tension between the bosses 12 and the inner surface of the skirt 11 on opposite sides thereof. However, it is to be understood that it is optional as to whether or not a pair of such expanders is employed to expand the skirt 11, or only one of said expanders. The description of one expander may, therefore, be applied to both.

The expander comprises an arcuate U-shaped shell of spring metal of a length to extend above and below the wrist pin bosses when in place, and to bear against the intermediate interior surface of the skirt throughout a substantial portion of its length. To increase the resiliency of the expander, that portion thereof bearing against the skirt is preferably provided with an expansion fold 14 formed intermediate its opposed end portions 15.

Each of the opposed end portions 15 near the upper side of the expander, or that side near the top of the piston, is provided with a diagonally disposed elongated camming slot 16. In vertical alignment therewith adjacent the bottom side of the expander there is formed an inwardly extending recess 17. Said recess 17 is formed with inwardly and upwardly tapering edges to provide camming surfaces complementary to the camming slot 16.

Slidably secured in the camming slots 16, respectively, there is a pair of interlocking and camming arms 18 having one end thereof inwardly curved at 19 to conform with the curvature of the side surfaces of the bosses 12 or, if desired, the corresponding surface of the wrist pin 12a for interlocking engagement therewith. The upper end of each of said arms is formed with an inwardly extending projection 20, such as a hook, rivet or the like, extending through the respective cam slots 16 in the expander, to interlock in sliding engagement therewith.

The opposite end or free end of each of the arms 18 comprises a screw threaded shank 21 over which the camming head 22 is slidably mounted for engagement with the lower side of the expander shell within the recess 17 formed therein. Said head is slotted at 23 to embrace the edge of the expander shell for slidably interlocking therewith, but said slot is formed to leave a body portion 24 engageable within the recess 17 to slidably bear upon the camming edge thereof. The threaded shank 21 also receives in threaded engagement therewith a nut 25 bearing against the head 22 for forcing it inwardly against the cam surface of recess 17 and at the same time drawing the hook 20 downwardly along the camming edge of the cam slot 16.

Figure 2:
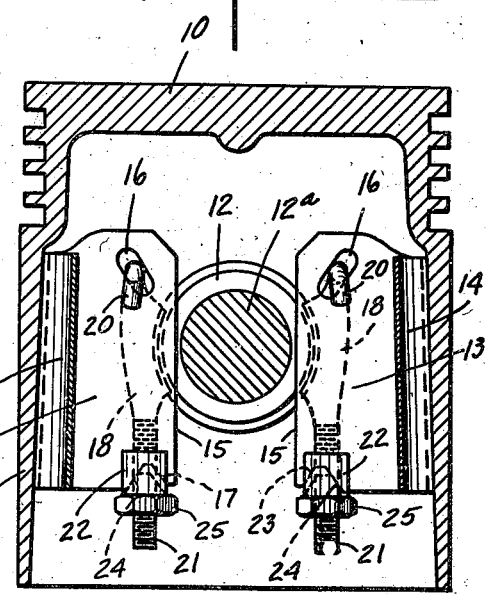
Fig. 2 is a section taken on the line 2—2 of Fig. 1, comprising a central vertical section through the piston and expanders.
Figure 3:
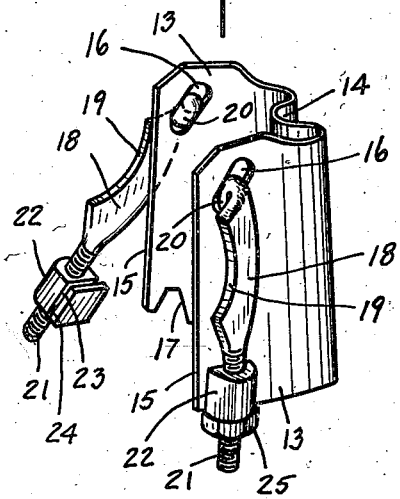
Fig. 3 is a perspective view of one of the expanders with the camming arms mounted thereon.
Figure 4:
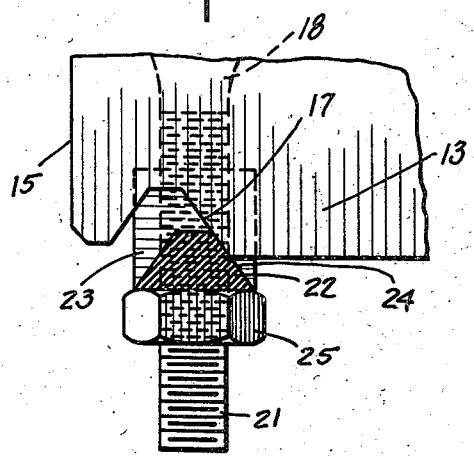
Fig. 4 is an enlarged view through a portion of the expander shell showing the head member in section.

Prior to installation of the expander the nuts 25 are screwed to their outermost positions on the shanks 21. This permits the arms to have free play about their hook connection in the slot 16, as shown in Fig. 3. In this position the expander may be freely inserted in the piston skirt to the position shown in Figs. 1 and 2. Having thus positioned the expander, the arms 18 are swung into engagement with the interior transverse structure of the piston, for example, with their arcuate portion 19 partially embracing the side surfaces of the bosses. When both arms are so positioned, the head 22 is adjusted over the recess 17 in the lower end portion of the expander with the body portion 24 thereof bearing against its camming surface. The nut 25 is then tightened down, forcing the head along the shank of the arm, causing the hook 20 and body portion 24 to slide along the respective camming surfaces of the slot 16 and recess 17. Continued movement of the nut 25 causes relative movement or displacement between the arms and the expander shell in its expanding direction. The expander is thereby brought under tension against the wall of the piston skirt. As the tension is increased by such relative movement or displacement, the expander flexes, such as to increase its spring tension and expanding action.

The expander is thereby interlocked by the arms 18 between the wall of the piston and its interior transverse structure, such as the bosses, with the arcuate portion of the arms gripped thereabout to prevent any longitudinal displacement or removal of the expander from the piston. Depending upon the variable positioning of the nuts 25 on the threaded shanks of the arms, the expander may be brought to any desired tension in its expanding direction as the hooks 20 are drawn downwardly and cammed laterally by the slot 16, and as the body portions 24 are forced upwardly, similarly cammed laterally by the recess 17.

It will furthermore be observed that the camming action between the arms and the expander shell may be such as to compensate for different sizes of pistons within limits, and through different adjustments of the nut 25 the extent of expansion or re-formation of the piston skirt may be controlled as desired. Thus, not only may fewer sizes of piston expanders be utilized for various piston sizes, but the expanding action is not dependent wholly upon the inherent spring tension of the expander, the inherent spring tension of the expander being variably increased as desired by the pressure thereon resulting from displacement by the camming action.

The invention claimed is:

1. A piston expander for expanding a piston skirt carrying an interior transverse structure, said expander including a spring metal shell having a central portion thereof engageable with the inner surface of the piston skirt opposite said structure and having opposed end portions extending toward said structure, an adjustable camming member mounted on each end portion of said shell for seating engagement with said structure, and means on each member adjustable to cause said members to displace said shell relative to said members and structure for compression thereof in its expanding direction.

2. A piston expander for expanding a piston skirt carrying an interior transverse structure, said expander including a spring metal shell having a central portion thereof engageable with the inner surface of the piston skirt opposite said structure and having opposed end portions extending toward said structure, an adjustable camming member mounted on each end portion of said shell for seating engagement with said structure, and an adjustable head mounted for adjustment on each of said members to engage and displace said expander shell relative to said members and structure for compression thereof in its expanding direction.

3. A piston expander for expanding a piston skirt carrying an interior transverse structure, said expander including a spring metal shell having a central portion thereof engageable with the inner surface of the piston skirt opposite said structure and having opposed end portions extending toward said structure, an adjustable camming member slidably mounted on each end portion of said shell arranged thereon to slide at an angle to the expanding direction thereof, and an adjustable head mounted for adjustment on each of said members engageable with said end portions of the shell for forcing said camming members in a direction to compress said shell between said members and the piston skirt in its expanding direction.

4. A piston expander for expanding a piston skirt carrying an interior transverse structure, said expander including a spring metal shell having a central portion thereof engageable with the inner surface of the piston skirt opposite said structure and having opposed end portions extending toward said structure, each end portion of said shell being provided with a biased slot, an adjustable camming arm having one end thereof slidable in each of said slots and engageable with said transverse structure, each of said arms being provided with a screw threaded shank extending transversely of said end portions, and a head carried by each of said shanks positioned for engagement with the edges of the end portions opposite said slots and movable relative thereto to adjusted position for effecting displacement between said members and shell through the biased camming action of said slots to compress said shell in its expanding direction.

5. A piston expander for expanding a piston skirt carrying an interior transverse structure, said expander including a spring metal shell having a central portion engageable with the inner surface of the piston skirt opposite said structure and having opposed end portions extending toward said structure, said end portions each being provided with a biased elongated slot at one side thereof and a camming recess at the opposite side thereof, a pair of camming arms mounted on said end portions in position to engage said transverse structure having one end slidably interlocking with said slots respectively and the other end provided with a shank portion, a head slidably mounted on each of said shank portions for camming engagement with said camming recesses respectively, and a locking member on each of said shank portions for forcing the respective heads into interlocking engagement with said shell and effecting displacement between said arms and shell through the camming action of said slots and recesses whereby said shell will be compressed in its expanding direction in accordance with the pressure exerted on said heads.

6. A piston expander for expanding a piston skirt carrying an interior transverse structure, said expander including a spring metal shell having a central portion thereof engageable with the inner surface of the piston skirt opposite said structure and having opposed end portions extending toward said structure, each of said end portions having a biased elongated camming slot formed therein on one side thereof, adjustable camming arms each having one end slidably engaging in each slot and provided with an arcuate side portion formed to embrace and interlock said transverse structure, and means on each of said arms engageable with the edge of the expander shell opposite said slots for drawing said arms along said slots in a direction to force them toward said transverse structure and thereby displace said shell relative thereto for compression thereof in its expanding direction.

7. A piston expander for expanding a piston skirt carrying an interior transverse structure, said expander including a spring metal shell having a central portion thereof engageable with the inner surface of the piston skirt opposite said structure and having opposed end portions extending toward said structure, each of said opposed end portions having an angularly disposed camming surface adjacent one side thereof and an opposed angularly disposed camming surface at the opposite side thereof, a pair of arms each having one end engaging said first-mentioned camming surfaces respectively and a portion thereof formed to engage and interlock with said transverse structure, and a head adjustably carried on each of said arms engageable with said last-mentioned camming surface to cam said arms toward said transverse structure for displacing said shell and compressing it against the wall of the piston in its expanding direction.

8. A piston expander for expanding a piston skirt carrying an interior transverse structure, said expander including a spring metal shell having a central portion thereof engageable with the inner surface of the piston skirt opposite said structure and having opposed end portions extending toward said structure, each of said opposed end portions having an elongated angularly disposed slot therein on one side thereof and an inwardly formed recess in the edge of the opposite side thereof, a pair of arms each having a sliding connection with one of said end portions through the respective slots and provided with arcuate bearing surfaces for interlocking engagement with said transverse structure, a bifurcated head slidable on each of said arms embracing the recessed portion of said shell and engageable with an inwardly tapering surface formed therein, and a nut threaded on each of said arms bearing against the respective heads for drawing said heads and the opposite ends of said arms together to effect a camming action with their respective slots and recesses for displacement thereof towards said transverse structure to effect a variable controlled compression of said shell in its expanding direction.

9. A piston expander comprising an approximately semi-cylindrical shell of resilient metal, said shell having a biased cam slot formed at one side thereof and a cam recess formed at the opposite side thereof in each of its free end portions, an interlocking and camming arm carried on each end portion of said expander, one end of each arm having sliding and camming engagement within the respective slots, and a camming head adjustably mounted on the opposite ends of said arms for camming engagement in the respective recesses.

10. A piston expander comprising an approximately semi-cylindrical shell of spring metal, said shell having a biased cam surface formed at one side thereof adjacent each of its end portions, an interlocking camming arm engageable with each of said cam surfaces, and an adjustable head on each arm engageable with said shell for displacing said arms relative thereto through the camming action of the engaged cam surfaces.

11. A piston expander comprising an approximately semi-cylindrical shell of resilient metal, said shell having an elongated angularly disposed slot having a camming surface formed at one side thereof in each of its opposed end portions and having a recess formed with a cam surface on the opposite side thereof from said slots, an interlocking and camming arm carried on each side of said expander, one end of each of said arms having interlocking but sliding engagement with the respective slots and terminating at the other end with a threaded shank portion, said arms being provided with an arcuate bearing surface intermediate their ends facing the free edges of said end portions, a head slidable on the shank portion of each of said arms for camming engagement with said recesses, said head being bifurcated to embrace and interlock therewith, and a nut in threaded engagement with each of said shanks bearing against the respective heads for forcing said heads and the opposite ends of said arms over said camming surfaces to adjustably effect displacement of said arms toward the free edges of the opposed end portions.

WALTER J. SIX.